United States Patent
Larsson et al.

(10) Patent No.: US 9,380,544 B2
(45) Date of Patent: Jun. 28, 2016

(54) USER EQUIPMENT, BASE STATION AND METHODS RELATED TO MULTIPLE INPUT MULTIPLE OUTPUT

(71) Applicant: TELEFONAKTIEBOLAGET L M ERICSSON (PUBL), Stockholm (SE)

(72) Inventors: Erik Larsson, Uppsala (SE); Peter Von Wrycza, Stockholm (SE); Bo Goransson, Sollentuna (SE); Cagatay Konuskan, Stockholm (SE); Thomas Chapman, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 158 days.

(21) Appl. No.: 13/990,817

(22) PCT Filed: Mar. 19, 2013

(86) PCT No.: PCT/SE2013/050298
§ 371 (c)(1),
(2) Date: May 31, 2013

(87) PCT Pub. No.: WO2013/141799
PCT Pub. Date: Sep. 26, 2013

(65) Prior Publication Data
US 2014/0064189 A1  Mar. 6, 2014

Related U.S. Application Data

(60) Provisional application No. 61/612,587, filed on Mar. 19, 2012.

(51) Int. Cl.
*H04W 52/52* (2009.01)
*H04W 52/32* (2009.01)
*H04W 52/28* (2009.01)
(Continued)

(52) U.S. Cl.
CPC ............ *H04W 52/52* (2013.01); *H04W 52/286* (2013.01); *H04W 52/325* (2013.01); *H04W 52/16* (2013.01); *H04W 52/42* (2013.01)

(58) Field of Classification Search
None
See application file for complete search history.

(56) References Cited

U.S. PATENT DOCUMENTS

2011/0201376 A1* 8/2011 Hu ........................ H04B 7/0426
455/522
2011/0263281 A1* 10/2011 Cai ........................ H04B 7/0404
455/501

(Continued)

OTHER PUBLICATIONS

3GPP ETSI TS 125 213 V9.1.0 (Jan. 2010) Universal Mobile Telecommunications System (UMTS); Spreading and modulation (FDD).*

(Continued)

*Primary Examiner* — Jeffrey M Rutkowski
*Assistant Examiner* — Ning Li
(74) *Attorney, Agent, or Firm* — Patent Portfolio Builders, PLLC (57) ABSTRACT

It is presented a method for controlling multiple input multiple output, MIMO, pilot channel boosting. The method is performed in a user equipment, UE, capable of MIMO transmissions using a primary and a secondary stream. The method comprising the steps of: determining a rank used for uplink transmissions from the UE; and determining a boosting parameter affecting power boosting of an Enhanced Dedicated Physical Control Channel, E-DPCCH, and a Secondary Dedicated Physical Control Channel, S-DPCCH, based on the rank. A corresponding UE, base station and associated method are also presented.

15 Claims, 6 Drawing Sheets

(51) Int. Cl.
*H04W 52/42* (2009.01)
*H04W 52/16* (2009.01)

(56) References Cited

U.S. PATENT DOCUMENTS

| | | | | |
|---|---|---|---|---|
| 2012/0082192 A1* | 4/2012 | Pelletier | ............... | H04W 52/42 |
| | | | | 375/219 |
| 2012/0177089 A1* | 7/2012 | Pelletier et al. | ............... | 375/219 |
| 2012/0224555 A1* | 9/2012 | Lee | ............... | H04W 52/143 |
| | | | | 370/329 |
| 2012/0275403 A1* | 11/2012 | Zhang et al. | ............... | 370/329 |
| 2012/0287965 A1* | 11/2012 | Sambhwani | ............... | H04B 7/0413 |
| | | | | 375/141 |

OTHER PUBLICATIONS

"TP on Physical Layer Structure Alternatives due to UL MIMO for HSPA", R1-111554, QUALCOMM Incorporated, 3GPP TSG RAN WG1 Meeting #65 Barcelona, Spain, May 9-13, 2011, (10 Pages).

"Introduction to UL MIMO in HSPA", R1-106336, QUALCOMM Incorporated, 3GPP TSG RAN WG1 Meeting #63 Jacksonville, USA, Nov. 15-19, 2010, (10 Pages).

"*E-TFCI BetaEC* Boost and *E-TFCI BetaED Switch* IEs updates", *R3-072168*, 3GPP TSG-RAN WG3#58, Jeju, Korea, Nov. 5-9, 2007, (10 Pages).

International Search Report in corresponding International Application No. PCT/SE2013/050298, filed on Mar. 19, 2013 (4 pages).

Written Opinion in corresponding International Application No. PCT/SE2013/050298, filed on Mar. 19, 2013 (8 Pages).

3GPP TSG RAN WG1 Meeting #68, *QualComm Incorporated*, Feb. 2012, 3 pgs.

3GPP TS 25. 213 V11.1.0, $3^{rd}$ Generation Partnership Project; Technical Specification Group Radio Access Network; Spreading and modulation (FDD), Mar. 2012, 43 pgs.

3GPP TS 25.214 V11.1.0, $3^{rd}$ Generation Partnership Project; Technical Specification Group Radio Access Network; Physical layer procedures (FDD), Mar. 2012, 106 pgs.

* cited by examiner

USER EQUIPMENT, BASE STATION AND METHODS RELATED TO MULTIPLE INPUT MULTIPLE OUTPUT

This application is the U.S. national phase of International Application No. PCT/SE2013/050298 filed 19 Mar. 2013 which designated the U.S. and claims priority to U.S. Provisional Application No. 61/612,587 filed 19 Mar. 2012, the entire contents of each of which are hereby incorporated by reference.

TECHNICAL FIELD

This technology relates to a user equipment, a base station and methods related to multiple input multiple output (MIMO) transmission.

BACKGROUND

A MIMO system increases the performance and communication capacity of a wireless communication system. MIMO employs multiple transmission antennas and multiple reception antennas to enhance data transmission/reception efficiency, and hence, is also called a multiple antenna system. MIMO techniques may include transmit diversity, spatial multiplexing, and the like. Transmit diversity is a technique that transmits the same data from multiple transmission antennas to thus enhance a transmission reliability. Spatial multiplexing is a technique that simultaneously transmits different data from multiple transmission antennas to thus transmit high speed data without increasing a bandwidth of a system.

The capacity of a MIMO channel increases with the number of antennas. The MIMO channel may be viewed as multiple independent channels. Each independent channel may be a spatial layer. The expression "rank," or transmission rank, refers to the number of independent data streams, or spatial layers, transmitted over a wireless channel. If a transmitter is equipped with Nt antennas and the receiver has Nr antennas, the maximum spatial multiplexing order (the number of streams) is Ns=min (Nt, Nr) if a linear receiver is used. This means that a maximum of Ns streams can potentially be transmitted in parallel, ideally leading to an Ns increase of the spectral efficiency (the number of bits per second and per Hz that can be transmitted over the wireless channel). For example, if a transmitter has two antennas, then rank one means that one (the same) stream is sent over the two antennas and rank two means that two different streams are sent over the two antennas. But if a transmitter has four transmit antennas, then rank two means that two streams for example may also be sent over all four antennas. The number of antennas does, however, limit the maximum number of streams that can be transmitted.

In the complex situation of multiple, and dynamically changing, ranks it becomes increasingly difficult to optimise power usage for the different channels. It would be highly beneficial if available transmission power is used more efficiently by the UE in a MIMO capable UE.

SUMMARY

It is an object to improve the power usage by improving how boosting of control channels is performed.

According to a first aspect, it is provided a method for controlling multiple input multiple output, MIMO, channel boosting. The method is performed in a user equipment, UE, capable of MIMO transmissions using a primary and a secondary stream. The method comprises the steps of: determining a rank used for uplink transmissions from the UE; and determining a boosting parameter affecting power boosting of an Enhanced Dedicated Physical Control Channel, E-DPCCH, and a Secondary Dedicated Physical Control Channel, S-DPCCH, based on the rank. By determining boosting parameters based on rank, power available for transmissions can be tailored more efficiently. For example, for rank 1 transmissions the secondary stream needs less boosting than the primary stream, while for rank 2 transmissions, it is often beneficial to boost both the primary and the secondary stream to get sufficiently good channel estimates for demodulating data. Rank may be defined as a number of independent data streams, or spatial layers.

The boosting parameter may be a threshold value, defining different boosting schemes when an Enhanced Transmit Format Combination Indicator, E-TFCI, is above or below the boosting parameter.

The step of determining a boosting parameter may comprise determining the boosting parameter to be an absolute value when the rank is two. For example, the absolute value could be a negative number, such as −1, to effectively turn on boosting for the E-DPCCH and S-DPCCH whenever this pilot channel is active. The same absolute determining can be used to determine the boosting parameter when the rank is higher than two.

The step of determining a boosting parameter may comprise determining, when the rank is one, the boosting parameter using signalling by higher layers or to be a default value of 127 when the boosting parameter fails to be signalled by higher layers.

The method may further comprise the step of: applying the boosting parameter.

According to a second aspect, it is provided a user equipment, UE, arranged to control multiple input multiple output, MIMO, channel boosting. The UE is capable of MIMO transmissions using a primary and a secondary stream, and comprises: a memory containing functional modules; and a controller. The controller is configured to execute program code stored in the memory to: determine a rank used for uplink transmissions from the UE; and determine a boosting parameter affecting power boosting of an Enhanced Dedicated Physical Control Channel, E-DPCCH, and a Secondary Dedicated Physical Control Channel, S-DPCCH, based on the rank.

Rank may be defined as a number of independent data streams, or spatial layers.

The boosting parameter may be a threshold value defining different boosting schemes when an Enhanced Transmit Format Combination Indicator, E-TFCI, is above or below the boosting parameter.

The program code to determine boosting parameter may comprise program code to determine the boosting parameter to be an absolute value when the rank is two.

The program code to determine a boosting parameter may comprise program code to determine, when the rank is one, the boosting parameter using signalling by higher layers or to be a default value of 127 when the boosting parameter fails to be signalled by higher layers.

The memory may further comprise program code to: apply the boosting parameter.

According to a third aspect, it is provided a method for determining what multiple input multiple output, MIMO, channel boosting is used by a user equipment. The method being performed in a base station capable of receiving MIMO transmissions from the UE using a primary and a secondary stream. The method comprises the steps of: determining a rank used for uplink transmissions from the UE; and determining a boosting parameter used by the UE affecting power boosting of an Enhanced Dedicated Physical Control Channel, E-DPCCH, and a Secondary Dedicated Physical Control Channel, S-DPCCH, based on the rank.

Rank may be defined as a number of independent data streams, or spatial layers.

The boosting parameter may be a threshold value defining different boosting schemes when an Enhanced Transmit Format Combination Indicator, E-TFCI, is above or below the boosting parameter.

The step of determining a boosting parameter may comprise determining the boosting parameter to be an absolute value when the rank is two.

The step of determining a boosting parameter may comprise determining, when the rank is one, the boosting parameter using signalling by layers higher than the UE, or to be a default value of 127 when the boosting parameter fails to be signalled by layers higher than the UE.

According to a fourth aspect, it is provided a base station arranged to determine what multiple input multiple output, MIMO, channel boosting is used by a user equipment. The base station is capable of receiving MIMO transmissions from the UE using a primary and a secondary stream and comprises: a memory containing functional modules; and a controller. The controller is configured to execute program code stored in the memory to: determine a rank used for uplink transmissions from the UE; and determine a boosting parameter used by the UE affecting power boosting of an Enhanced Dedicated Physical Control Channel, E-DPCCH, and a Secondary Dedicated Physical Control Channel, S-DPCCH, based on the rank.

Rank may be defined as a number of independent data streams, or spatial layers.

The boosting parameter may be a threshold value defining different boosting schemes when an Enhanced Transmit Format Combination Indicator, E-TFCI, is above or below the boosting parameter.

The program code to determine a boosting parameter may comprise program code to determine the boosting parameter to be an absolute value when the rank is two.

The program code to determine a boosting parameter may comprise program code to determine, when the rank is one, the boosting parameter using signalling by higher layers or to be a default value of 127 when the boosting parameter fails to be signalled by higher layers.

The base station may be a node B.

It is to be noted that any feature of the first, second, third and fourth aspects may, where appropriate, be applied to any other of these aspects.

Whenever used in the claims and description herein, the term 'boosting' is to be interpreted as increasing the signal or power level of one or more radio communication parameters.

Whenever used in the claims and descriptions herein, the phrase "boosting of a channel" is to be interpreted as boosting of one or more radio communication parameters transmitted on the channel in question.

The technology in this application introduces a mechanism that flexibly determines an amount of boosting to be applied by multi-antenna UE uplink streams that the UE is to transmit based on a current transmission rank of the UE. For example, rank 2 UE transmissions may use one boosting setting, and rank 1 UE transmissions may use another boosting setting (e.g., less or no S-DPCCH boosting). In general, one or more rank dependent boosting parameters are provided and used to implement rank-dependent boosting of multi-antenna UE transmissions.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analogue and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Figure 1:
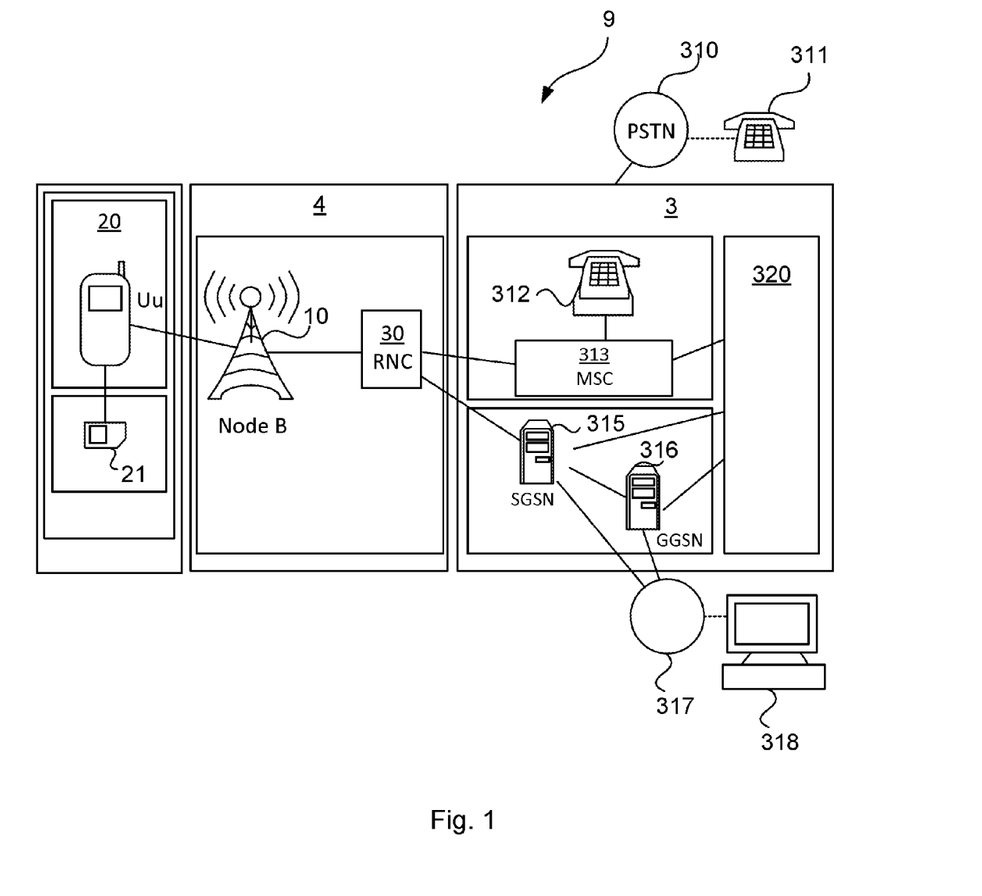
FIG. 1 is a schematic diagram illustrating an environment where embodiments presented herein can be applied.

FIG. 1 is a schematic diagram illustrating an environment where embodiments presented herein can be applied. A cellular communications network 9 comprises a core network 3 and a radio access network 4 comprising one or more base stations 10 and one or more radio network controllers 30. The base stations 10, are here in the form of Node Bs also known as NBs but could also be in the form of evolved Node Bs (eNodeBs/eNBs) and/or BTSs (Base Transceiver Stations) and/or BSSs (Base Station Subsystems), etc. The base stations 10 provide radio connectivity to a plurality of instances of user equipment (UEs) 20. The term UE is also known as wireless terminal, mobile terminal, user terminal, user agent, etc. The UE is in contact with a subscriber module 21, such as a Subscriber Identity Module (SIM or Universal Subscriber Identity Module (USIM), e.g. on a smart card.

The radio access network may optionally comprise one or more radio network controllers 30, which controls one or more base stations each. The radio access network 4 is also connected to a core network 3.

The core network 3 comprises a Mobile Switching Centre (MSC) 313 and a Gateway Mobile Switching Centre (GMSC) 312 for connectivity other circuit switched networks 310, such as a Public Switched Telephone Network (PSTN), for connectivity to analogue or digital telephones 311. The core network 3 also comprises a Serving GPRS (General Packet Radio Service) Support Node (SGSN) 315 and a Gateway GPRS Support Node (GGSN) 316 for connectivity to one or more packet switched external networks 317, such as the Internet, for connectivity with external computers 318 of any suitable type.

The core network 3 also comprises storage 320 in the form of various databases. These can include Visitor Location Register (VLR), Home Location Register (HLR), Equipment Identity Register (EIR), etc. There may also be a Short Messaging Service Centre (SMS-C) for managing text messages.

Each one of the base stations 10 provides radio coverage in one or more respective radio cells.

The cellular network 9 may e.g. comply with any one or a combination of UMTS utilising W-CDMA (Wideband Code Division Multiplex), LTE (Long Term Evolution), CDMA2000 (Code Division Multiple Access 2000), or any other current or future wireless network, as long as the principles described hereinafter are applicable.

Uplink (UL) and downlink (DL) communication between each wireless terminal 20 and the base station 10 occurs over a wireless radio interface Recent generations of Universal Mobile Telecommunications System (UMTS) incorporate MIMO. The basic architecture of a cellular network 9 complying with the UMTS system is shown in FIG. 1. UMTS is a 3G (Third Generation) system and uses Wideband Code Division Multiple Access (WCDMA).

The following description is cast in the context of High Speed Packet Access (HSPA), and more particularly, of High Speed Uplink Packet Access (HSUPA) in UMTS. 3GPP refers to HUSPA as Enhanced Uplink (EUL). However, the technology may be applied to other similar cellular systems.

For a UE 20 configured in an uplink (UE to base station) MIMO mode, current practical UE MIMO configurations provide for either single or dual-stream uplink transmissions to take place, which are also referred to as rank 1 and rank 2 transmissions, respectively. Dual-stream uplink transmissions can be useful in environments with high signal-to-interference-and-noise ratios (SINRs), and where the channel exhibits scattering and/or cross-polarized antennas are used. Single-stream transmissions may be beneficial to increase the pre-coding gain, i.e., a gain achieved by transmitting the same set of information on both antennas, and thereby improve the link budget, e.g., a simple link budget is Received Power (dBm)=Transmitted Power (dBm)+Gains (dB)−Losses (dB). The radio network (e.g., a serving base station 10 for a UE 20, which base station is called a NodeB in UMTS) may decide a preferred rank for uplink (UL) MIMO operation and signal that preferred rank to the UE 20. In general, the UE 20 adopts the recommended MIMO rank, but there will be situations where the UE 20 can/must override the network's MIMO rank recommendation.

Figure 2A:
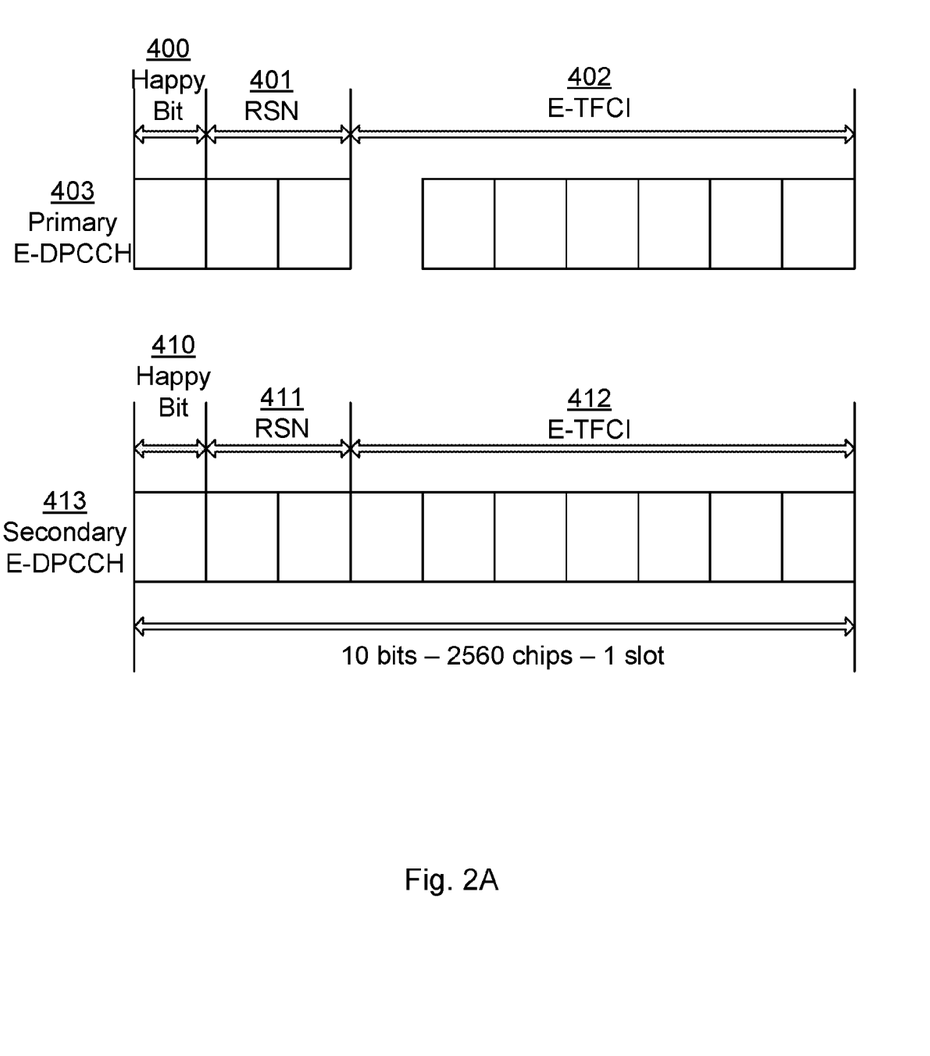
FIGS. 2A-B are schematic graphs illustrating channel structures used for communication over the wireless interface between the UE and the base station of FIG. 1.
Figure 2B:
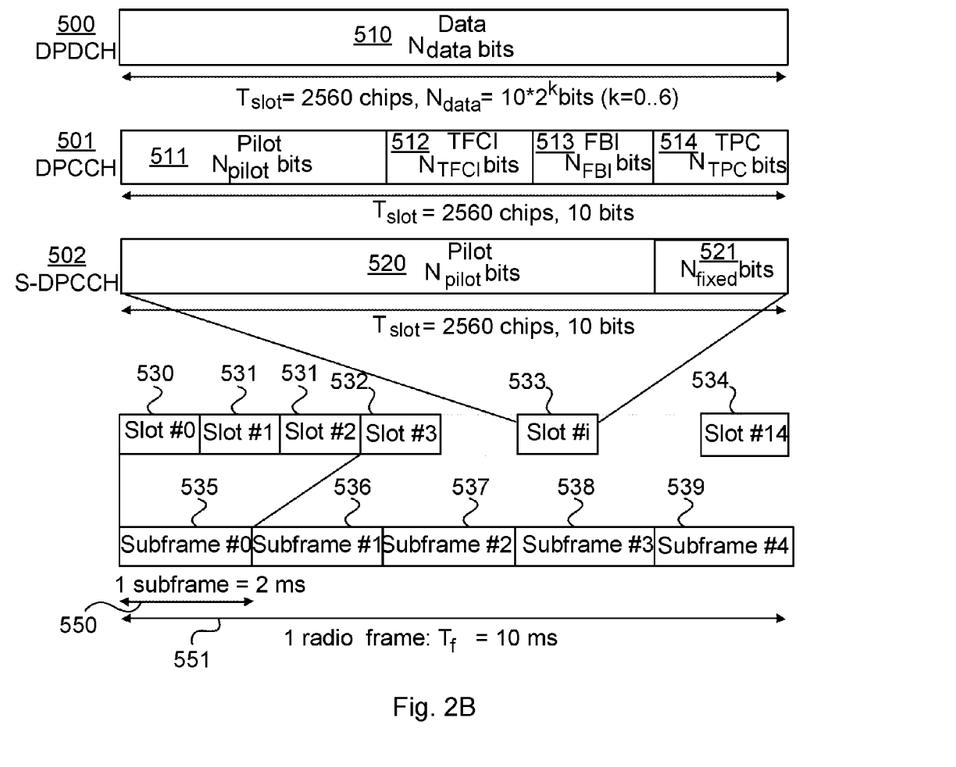

FIGS. 2A-B are schematic graphs illustrating channel structures used for communication over the wireless interface between the UE and the base station of FIG. 1.

In High Speed Uplink Packet Access (HSUPA), there is typically one Enhanced Uplink (EUL) control channel associated with each stream. There is a primary control channel, e.g., the Enhanced Dedicated Transport Channel (E-DCH) Dedicated Physical Control Channel (E-DPCCH) 403, and a secondary control channel, e.g., Secondary E-DPCCH (S-E-DPCCH) 413, which will only be transmitted if dual MIMO stream transmission is employed. The E-DPCCH 403 is a physical channel used to transmit control information associated with the E-DCH and is transmitted at the same instant on the radio frame as the E-DPDCH channel carrying data for E-DCH transport channel.

The information carried by E-DPCCH 403 includes a Retransmission Sequence Number (RSN) 401 that indicates a Hybrid Automatic Repeat Request (HARQ) transmission number to the network, a Happy Bit 400 used by a UE to indicate if the UE needs more resources, or more specifically, could benefit from a higher grant in the UL to transmit pending data by setting this bit to "Unhappy," and an Enhanced-Transmit Format Combination Indicator (E-TFCI) 402 of the current E-DPDCH transmission. The secondary E-DPCCH comprises corresponding happy bit 410, RSN 411 and E-TFCI 412. For both the Primary E-DPCCH and the Secondary E-DPCCH 413, these components use 10 information bits, which are coded into 30 bits using a Reed-Müller code and sent over one TTI (Time Transmission Interval).

See FIG. 2A which shows a time slot format for the primary E-DPCCH and a secondary E-DPPCH, and FIG. 2B which shows a time slot format for the primary DPCCH and a secondary DPPCH.

In FIG. 2B, the DPDCH 500 is the data channel and comprises $N_{data}$ bits of data 510, where $N_{data}=10*2^k$ bits, k=0.6.

The DPCCH 501 comprises $N_{pilot}$ bits of pilot bits 511, $N_{TFCI}$ bits of TFCI bits 512 and $N_{FBI}$ bits of FBI (FeedBack Information) bits 513 and $N_{TPC}$ bits of TPC (Transmit Power Control) bits 514.

The S-DPCCH 413 comprises $N_{pilot}$ bits of pilot bits 520 (which may differ from the $N_{pilot}$ for the primary DPCCH 501), and $N_{fixed}$ bits of fixed bits 521.

As in FIG. 2A, each of the above structures apply to a slot 533 of 10 bits, which is equal to 2560 chips. Slots 530-534 form part of subframes 535-539, each with a length 550 of 2 ms. Five subframes 535-539 make up one radio frame 551 of a length of 10 ms.

The E-DPCCH power level is important for proper decoding of the physical channel and subsequent interpretation of E-DPDCH. The E-DPCCH power level is specified with respect to that of DPCCH, i.e., the ratio E-DPCCH power to DPCCH power is called the E-DPCCH Gain Offset and equals $\beta_{ec}/\beta_c$, where $\beta_{ec}$ is the gain factor for E-DPCCH and controls the E-DPCCH power and $\beta_c$ is the gain factor for DPCCH. The E-DPCCH power offset is signalled by the RRC (Radio Resource Control) as an E-DPCCH-DPCCH-Power Offset information element (IE) in the radio link set up message.

So in Release 6, the E-DPCCH power in the UL is calculated based on the parameter E-DPCCH Power Offset, which gives the power relative to the DPCCH power. The power of E-DPCCH is the same for all transmissions of E-DPDCH and a new RRC reconfiguration message has to be sent if the power has to be increased. The E-DPCCH gain factor is given by equation [1] below:

$$\beta_{ec}=\beta_c \cdot A_{ec} \quad [1]$$

where $A_{ec}$ is the E-DPCCH Gain Offset signalled by RRC for that radio link.

Release 7 provides for E-DPCCH power boosting according to the parameters signalled by the RRC. The parameters signalled include e-DPCCH-DPCCH-PowerOffset, happy- Bit-DelayCondition, e-TFC-Boost-Info., e-DPDCH-Power-Interpolation, e-TFCI-Boost (an E-TFCI threshold beyond which boosting of E-DPCCH is enabled), and delta-Traffic to Total Pilot power offset (T2TP). The power of E-DPCCH is automatically boosted when the uplink (UL) data rate on E-DPDCH is higher, by configuring e-TFCI-Boost, i.e., the E-TFCI beyond which the E-DPCCH boosting comes into effect. For E-TFCI below this, the static relation as in Release 6 above is applied. To control the amount of boosting, the delta-T2TP parameter controls the quantized level of E-DPCCH power chosen according to the following equation [2]:

$$\beta_{ec,i,uq} = \beta_c \sqrt{\max\left(A_{ec}^2, \frac{\sum_{k=1}^{K_{max,i}} \left(\frac{\beta_{ed,i,k}}{\beta_c}\right)^2}{10^{\frac{\Delta_{T2SP}}{10}}}\right)} \quad [2]$$

This equation is used to calculate the E-DPCCH power level for every UE uplink (UL) transmission. A similar calculation is used for calculation of S-DPCCH power level. The power level of all the E-DPDCH channels to be used in the upcoming transmission influence the power of the E-DPCCH channel. $A_{ec}$ is the E-DPCCH power offset, $\beta_{ed,i,k}$ is the E-DPDCH gain factor for the i-th E-TFC on the k-th physical channel, and $K_{max,i}$ is the number of physical channels used for the i-th E-TFC. From the above equation, the E-DPCCH power is always greater than or equal to that given by the static relation of Release 6. A higher value of delta-T2TP means the traffic channel is stronger, and as a result, the E-DPCCH power will be lower.

Demodulation of larger Transport Block Sizes (TBSs) using higher order modulation requires good channel estimates. Even though there are no known pilots in the E-DPCCH (in contrast the known pilots included in DPCCH), the E-DPCCH symbols can be detected, e.g., by hard decisions, soft symbols, etc., and then can be subsequently used as pseudo pilots. If the detected symbols are incorrect (e.g., if the E-DPCCH has low power), this will affect the channel estimation procedure negatively. Nevertheless, E-DPCCH-aided channel estimation (i.e., using both DPCCH pilots and E-DPCCH symbols as pilots) can improve the channel estimates as compared to only using DPCCH pilots. E-DPCCH boosting provides a way to potentially obtain better channel estimates for larger TBSs because the E-DPCCH power is related to the TBS. E-DPCCH-aided channel estimation with E-DPCCH boosting improves the channel estimate quality proportional to the size of the TBS used. More specifically, DPCCH and E-DPCCH information (symbols) are combined in order to improve channel estimates as compared to only using DPCCH pilots. Furthermore, the power of the E-DPCCH increases with increasing TBSs, i.e., as indicated by E-TFCIs, which gives more pilot power for larger TBSs, and hence, improved channel estimates.

The E-DPCCH-aided channel estimation is outlined now as a two-step approach (considering symbol level processing). First, the DPCCH is de-spread to obtain and use the known pilot symbols contained in the DPCCH to determine a first estimate of the channel. Second, the E-DPCCH is de-spread (and possibly decoded) using that initial channel estimate. The detected E-DPCCH symbols (formed, e.g., by hard decision, soft symbols, or decoded symbols) are effectively used as additional pilots to obtain a second and (hopefully) improved channel estimate. When E-DPCCH boosting is applied, the E-DPCCH power is given by the equation [2] above.

Many multi-antenna techniques, such as closed-loop beamforming (also referred to as closed-loop transmit diversity (CLTD)) or MIMO benefit from or even require knowledge of the whole channel matrix (the channel between all Tx and Rx ports/antennas) in order to determine channel state information (CSI) or to demodulate data. MIMO refers here to spatial multiplexing, i.e., using the spatial dimension to send possibly more than one stream of data. To estimate the channel matrix, additional pilots are needed, essentially one for each Tx antenna.

Work on uplink closed-loop transmit diversity (CLTD) led to introduction of a second pilot channel (the S-DPCCH). Release 11 also adopted a pre-coded channel structure where all physical channels are pre-coded with a primary or secondary pre-coding vector (all legacy channels are pre-coded using the primary pre-coding vector, whereas the S-DPCCH is pre-coded using the secondary pre-coding vector). For CLTD, pilots are used for two purposes: demodulating data and sounding the channel in order to determine the appropriate pre-coding vectors. Due to the pre-coding framework, the process of demodulating data can be based on only the primary pilot (DPCCH) or both pilots (DPCCH & S-DPCCH), whereas the channel sounding procedure needs both pilots. In general, the channel sounding procedure is typically insensitive to the quality of the channel estimates, whereas data demodulation is more sensitive to poor channel estimates, especially for large TBSs utilizing higher order modulation.

Also, it is common to average the channel estimates over several slots in order to further improve the channel estimates. So depending on the adopted data demodulation, channel sounding, and channel estimation procedures, there might or might not be a need to boost both pilots to get sufficient quality of the channel estimates. Although the E-DPCCH boosting procedures introduced in Release 7 only affects the primary stream, it is desirable to introduce the possibility to boost the pilots of the secondary stream. Since no secondary E-DPCCH is transmitted on the secondary stream, the S-DPCCH can be boosted directly using a similar mechanism as used for E-DPCCH boosting, i.e., the power of the S-DPCCH is determined via the used E-TFCI and the traffic-to-second-pilot (T2SP) power ratio.

At 3GPP RAN (Radio Access Network) #54, a work item (WI) on MIMO with 64QAM (Quadrature Amplitude Modulation) for HSUPA was initiated (see R1-120585, 3GPP TSG RAN WG1 Meeting #68, Dresden, Germany, 6th-10th Feb. 2012). The WI initialization resulted from studies regarding potential benefits and solutions performed during the study item (SI) phase.

For a UE configured in uplink MIMO mode, either single or dual-stream transmissions can take place, also referred to as rank 1 and rank 2 transmissions, respectively. Although the physical channel layout for MIMO may be based on CLTD principles, i.e., pre-coded physical channels, one difference between MIMO and CLTD is that a rank 2 MIMO user will transmit data on both streams. Whether the control information associated with the second stream (called the S-E-DPCCH) will be transmitted on the primary or the secondary stream is still an open question.

Against the considerations of good channel estimates for demodulating data with large TBSs using higher order modulation (the quality of channel estimates is less crucial for PCI (Physical Cell Identity)/rank estimation), the CLTD boosting framework, where the primary stream (P-DPCCH) is boosted based on the traffic-to-primary-pilot power ratio and the secondary stream (S-DPCCH) may be boosted based on the traffic-to-secondary-pilot power ratio, might be too inflexible for MIMO operation. For example, for rank 1 transmissions, it might be sufficient to boost only the primary pilot stream (but not the secondary pilot stream). Although there is only one data stream (one stream containing E-DPDCH), there are still two orthogonal streams transmitted, where the second stream for rank 1 transmissions only contains the S-DPCCH (pilots).

For S-DPCCH boosting, it is the power of the S-DPCCH that varies depending on E-TFCI (irrespective of the rank). But it might be useful to only boost S-DPCCH for rank 2 transmission when data is transmitted, and instead, use the S-DPCCH boosting power for rank 1 transmissions on data. CSI information, such as which rank and pre-coding vectors to use, may be processed sufficiently well without S-DPCCH boosting, and the power which would have been spent on boosting the S-DPCCH if S-DPCCH boosting was applied can then be spent on data for the primary P-DPCCH stream, hence potentially increasing the throughput performance. For rank 2 transmissions, on the other hand, it might be necessary to boost both the primary and secondary streams to attain sufficiently good channel estimates for demodulating data. Recall that for rank 2, data is transmitted on both/two streams.

Accordingly, it would be beneficial to flexibly boost the secondary stream for rank 2 transmissions but not boost the secondary stream for rank 1 transmissions. In addition, it would be advantageous to selectively provide a smaller amount of boosting of the secondary stream for rank 1 transmissions and a greater amount of boosting of the secondary stream for rank 2 transmissions.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

A cell is associated with a base station, where a base station comprises in a general sense any node transmitting radio signals in the downlink (DL) and/or receiving radio signals in the uplink (UL). As mentioned above, example base stations are a NodeB, eNodeB, eNB, macro/micro/pico radio base station, home eNodeB, relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

Although the description is given for user equipment (UE), it should be understood by the skilled in the art that "UE" is a non-limiting term comprising any wireless device or node equipped with a radio interface allowing for at least one of: transmitting signals in UL and receiving and/or measuring signals in DL. Some examples of UE in its general sense are PDA, laptop, mobile, sensor, fixed relay, mobile relay, a radio network node (e.g., an LMU or a femto base station or a small base station using the terminal technology). A UE herein may comprise a UE (in its general sense) capable of operating or at least performing measurements in one or more frequencies, carrier frequencies, component carriers or frequency bands. It may be a "UE" operating in single-RAT or multi-RAT or multi-standard mode.

The example embodiments are not limited to UMTS, but may apply to other Radio Access Network (RAN), single-RAT or multi-RAT that supports MIMO communications. Although the description focuses on rank one and rank two, the technology may be adapted for application to higher UE ranks.

Embodiments described herein may be considered as independent embodiments or may be considered in any combination with each other to describe non-limiting examples. The example embodiments below are described for illustration purposes in a non-limiting UMTS/HSPA context.

Figure 3:
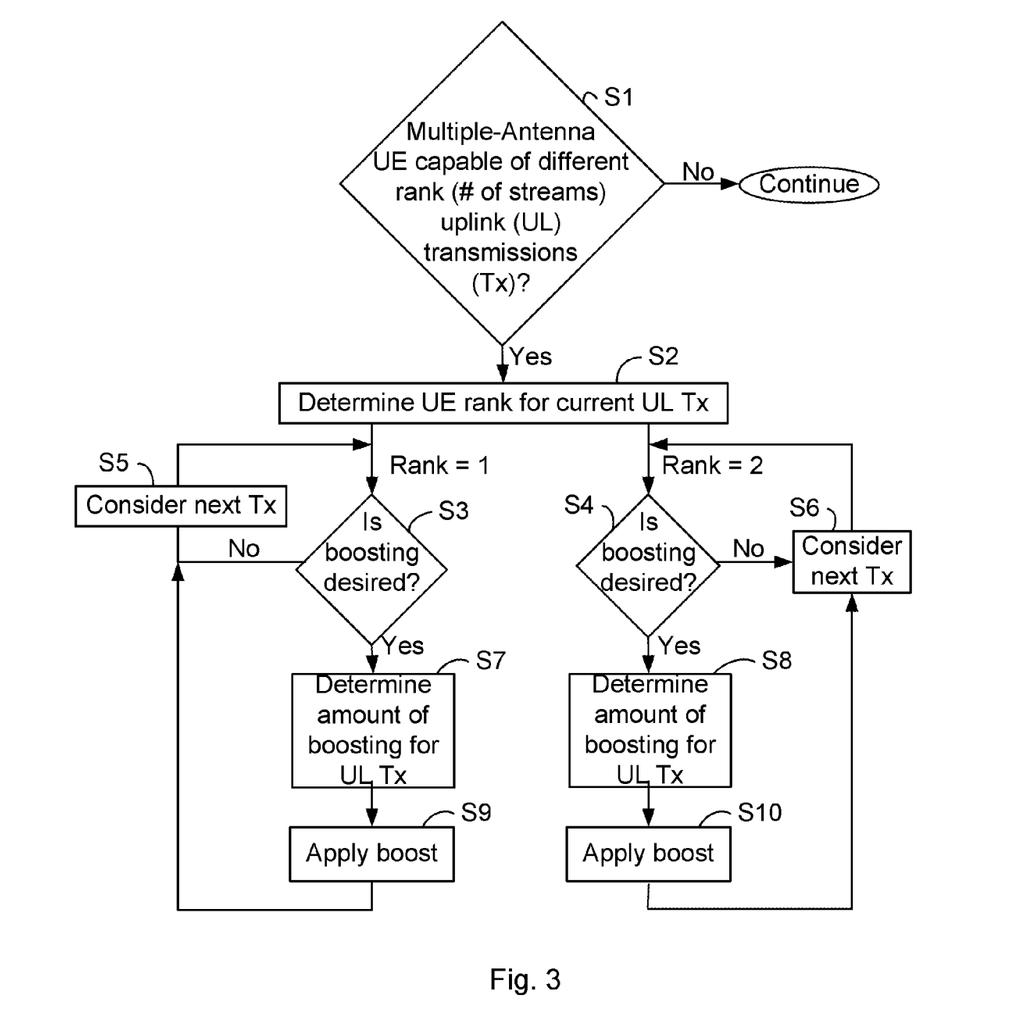
FIG. 3 is a flowchart diagram that illustrates example procedures for a rank-dependent boosting technology performed in a UE of FIG. 1.

FIG. 3 is a flowchart diagram that illustrates example procedures for the rank-dependent boosting technology. An initial decision is made whether the UE employs multiple antennas and is capable of different rank (i.e., transmitting different numbers of streams) uplink transmissions (step S1). This decision is logical and does not necessarily need to be performed by the UE. For example, this can be determined by the parameter UL_MIMO_Enabled being set to TRUE. The UE determines a rank for a current uplink transmission (step S2). If the rank is 1, the procedure continues to a conditional is boosting required step S3. On the other hand, if the rank is 2, the procedure continues to a conditional is boosting required step S4.

A decision is made for a determined rank 1 transmission whether boosting is desired (step S3). If not, a next uplink transmission is considered (step S5), and control returns to step S3. On the other hand, if boosting is desired, an amount of boosting is determined for the uplink transmission (step S7), (it may depend for example on the amount of data to be transmitted, e.g. indicated by E-TFCI), and the determined boost is applied to the transmission, which application may also depend for example on the amount of data to be transmitted (step S9).

A decision is also made for a determined rank 2 transmission whether boosting is desired (step S4). If not, a next uplink transmission is considered (step S6), and control returns to step S4. On the other hand, if boosting is desired, an amount of boosting is determined for the uplink transmission (step S8), (it may depend for example on the amount of data to be transmitted, e.g. indicated by E-TFCI), and the determined boost is applied to the transmission, which application may also depend for example on the amount of data to be transmitted (step S10).

The amount of boosting may thus vary from transmission to transmission depending on the determined rank, whether boosting is desired, how boosting is determined, and/or how boosting is applied. Although illustrated for simplicity for rank 1 and rank 2 UE transmissions, the technology is applicable to any multi-antenna transmission ranks.

The description below focuses on the S-DPCCH boosting (and E-DPCCH boosting), but the ideas are more generally applicable. For example, the flexible, rank-base boosting technology can be applied to different combinations of boosting such as E-DPCCH boosting, S-E-DPCCH boosting, or HS-DPCCH boosting. And again, although the description is in the context of rank 1 and rank 2 UE transmissions, but the technology is applicable to any multi-antenna transmission ranks.

As explained above, the existing/legacy EUL control channel, the E-DCH Dedicated Physical Control Channel (E-DPCCH), carries information about which E-DCH Transport Format Combination Indicator 402 (E-TFCI) (7 bits) that is used, a Retransmission Sequence number 401 (RSN) (2 bits), and a happy bit 400 (1 bit). For MIMO operation, the E-DPCCH is associated with the primary stream (transmitted in rank 1 and rank 2), i.e., the E-DPCCH will contain information about data transmitted on the primary stream. Similar information regarding the data for the secondary stream (transmitted during rank 2) is carried on the Secondary E-DPCCH (S-E-DPCCH).

Initially, some of the standardized procedures for setting the gain factor $\beta_{sc}$ for boosting the S-DPCCH are explained. Similar mechanisms are standardized for the boosting the E-DPCCH, and similar mechanisms can be used for boosting of other channels, e.g., S-E-DPCCH, HS-DPCCH, etc. See 3GPP TS 25.213 or TS 25.214.

For 3GPP S-DPCCH boosting, when E-TFCI≤E-TFCI$_{ec,boost}$, the gain factor $\beta_{sc}$ is derived based on the quantized amplitude ratios $A_{sc}$ (gain offset) which is translated from $\Delta_{S\text{-}DPCCH}$ signalled by higher layers. The translation of $\Delta_{S\text{-}DPCCH}$ into quantized amplitude ratios $A_{sc}=\beta_{sc}/\beta_c$ is specified in the table below (which is disclosed as Table 1C.1 in 3GPP TS 25.213).

TABLE 1

$A_{sc}$ values dependent on $\Delta_{S\text{-}DPCCH}$

| Signalled values for $\Delta_{S\text{-}DPCCH}$ | Quantized amplitude ratios $A_{sc}$ |
|---|---|
| 6 | 1.0 |
| 5 | 12/15 |
| 4 | 11/15 |
| 3 | 10/15 |
| 2 | 9/15 |
| 1 | 8/15 |
| 0 | Switch off |

When E-TFCI>E-TFCI$_{ec,boost}$, in order to provide an enhanced phase reference, the value of $\beta_{sc}$ is derived based on the traffic to secondary pilot power offset $\Delta_{T2SP}$, configured by higher layers, and following the definition of $\Delta_{T2TP}$ as specified in Table 1B.0 in 3GPP TS 25.213 and the quantization of the ratio $\beta_{sc}/\beta_c$ following the quantization of $\beta_{ec}/\beta_c$ as specified in Table 1B.0A in 3GPP TS 25.213.

In non compressed frames, if E-TFCI$_i$ is smaller than or equal to the threshold E-TFCI$_{ec,boost}$, where E-TFCI$_i$ denotes the E-TFCI of the i:th E-TFC, $\beta_{sc}$ is calculated according to equation [3] below:

$$\beta_{sc}=\beta_c \cdot A_{sc} \quad [3]$$

where the $\beta_c$ value is signalled by higher layers or calculated. $A_{sc}$ is derived according to Table 1 above, and the threshold E-TFCI$_{ec,boost}$ value is signalled by higher layers. In non compressed frames, if E-TFCI$_i$ is greater than E-TFCI$_{ec,boost}$, then the unquantized S-DPCCH gain factor for the i:th E-TFC, $\beta_{sc}$ is calculated according to the formula [4]:

$$\beta_{sc,i,uq} = \beta_c \sqrt{\max\left(A_{sc}^2, \frac{\sum_{k=1}^{K_{max,i}} \left(\frac{\beta_{ed,i,k}}{\beta_c}\right)^2}{10^{\frac{\Delta_{T2SP}}{10}}}\right)} \quad [4]$$

where $\Delta_{T2SP}$ is signalled by higher layers and is defined in TS 25.214, "Physical layer procedures (FDD)", v11.1.0, sub-clause 4.2.1.4, $\beta_{ed,i,k}$ is the E-DPDCH gain factor for the i:th E-TFC on the k:th physical channel and is the number of physical channels used for the i:th E-TFC, and the quantization of $\beta_{sc,i,uq}$ follows the quantization according to the definition of $\beta_{ec}$ quantization in table 1B.0A of TS 25.214, "Physical layer procedures (FDD)", v11.1.0.

Thus, the S-DPCCH boosting procedure is mainly dictated by E-TFCI$_{ec,boost}$, and $\Delta_{T2SP}$. The threshold value E-TFCI$_{ec,boost}$ may be signalled by higher layers. If the threshold value E-TFCI$_{ec,boost}$ is not signalled by higher layers, a default value, e.g., 127, may be used. The boosting of E-DPCCH may be done in a similar manner as described earlier in the background.

Non-limiting examples of rank-dependent boosting parameters are now described. For a first example, E-TFCI$_{ec,boost}$ is made dependent on the current UE transmission rank. This means a first threshold, E-TFCI$_{ec,boost}$, is determined for rank 1 transmissions (e.g. to what is described in the preceding paragraph) and a second different threshold, E-TFCI$_{ec,boost}$, may be determined for rank 2 transmissions. The second E-TFCI$_{ec,boost}$ can be absolute. For example, E-TFCI$_{ec,boost}$ can be set to −1, whereby boosting in the rank 2 case occurs irrespective of the E-TFCI value, i.e. whenever rank 2 transmissions occur. This is due to boosting being applied when E-TFCI≤E-TFCI$_{ec,boost}$. Alternatively, the second E-TFCI$_{ec,boost}$ can be relative to the first E-TFCI$_{ec,boost}$.

If only one E-TFCI$_{ec,boost}$ is provided/signalled, then this could mean that both E-TFCI$_{ec,boost}$ parameters are equal or that one is set to a default value, e.g., 127.

A second example includes determining different boost threshold E-TFCI$_{ec,boost}$ values for E-DPCCH boosting and S-DPCCH boosting. The different E-TFCI$_{ec,boost}$ values can be absolute or relative to each other.

In a third example, ΔT2SP and/or ΔT2TP (or corresponding parameter for other channel) is made dependent on the UE transmission rank. This means ΔT2SP and/or ΔT2TP are assigned different values for rank 1 transmissions and rank 2 transmissions. The rank-based parameter values can be absolute (independent of each other) or relative each other. In other words, the second E-TFCI$_{ec,boost}$ can be absolute or relative to the first E-TFCI$_{ec,boost}$. If only one delta value is provided/signalled, then this could mean that the same value is used for both rank 1 and rank 2 or that one is set to a default value.

A fourth example introduces one or more additional parameters that describe the rank dependency. For example, a parameter α is introduced that is a function of the rank and/or possibly a type of boosting, i.e., the type of channel type being boosted. Then the gain factor is multiplied directly by α or some other relevant factor like $$\sum_{k=1}^{K_{max,i}} \left(\frac{\beta_{ed,i,k}}{\beta_c}\right)$$

by α.

Any combinations of the above alternatives may be employed. The rank dependent values can be signalled from the network to the UE semi-statically via higher layer signaling, e.g., RRC or L2/L3 signaling, or more dynamically via, e.g., HS-SCCH (High Speed Shared Control Physical Channel) orders.

More detailed, non-limiting examples are now described. Assume that boosting for S-DPCCH is configured (turned on). Then the UE performs the following steps, each Time Transmission Interval (TTI) where new data should be scheduled/transmitted. Some or all of these steps relate to the apply boosting parameter(s) step 54 described below with reference to FIG. 5B. In the first step, based on the UE's serving grant and the E-TFC selection mechanism, the UE derives an E-TFCI to use for its uplink transmissions. The E-TFCI specifies the transport block size. This is described in the MAC (Medium Access Control) 3GPP TS 25.321, section 11.8.1.4. For the second step the UE decides what power to use on different physical channels, e.g., E-DPDCH, E-DPCCH, and S-DPCCH. This is given by the power control and scaling mechanisms and the different gain/beta-values, e.g., $\beta_c$ for DPCCH, $\beta_{ec}$ for E-DPCCH, $\beta_{ed}$ for E-DPDCH, and $\beta_{sc}$ for S-DPCCH. The following focuses on the gain setting of the S-DPCCH. If E-TFCI>E-TFCI$_{ec,boost}$, then no boosting is applied, and the gain $\beta_{sc}$ is determined from $\beta_{sc}=\beta_c \cdot A_{sc}$, where $A_{sc}$ is given by higher-layer signaling. If E-TFCI>E-TFCI$_{ec,boost}$, then the rank-based boosting is applied, and $\beta_{sc}$ is set so that the traffic to secondary pilot power offset $\Delta_{T2SP}$ is satisfied, i.e., the ratio between the power transmitting data and the power transmitting S-DPCCH equals $\beta_{T2SP}$. Hence, the more power used to transmit data, the more power needs to be allocated to the S-DPCCH.

The network (e.g., base station such as NodeB) needs to take similar steps to know what power that is used on each UL channel, as described further with reference to FIG. 6 below. This knowledge may be needed in order to decode data correctly, do channel estimation, etc. By decoding the control channel E-DPCCH, the NodeB determines the E-TFCI selected by the UE in the E-TFC selection process. Next, the NodeB can apply the same two-step procedure as the UE just described to derive what transmit powers each channel has used.

The parameters E-TFCI$_{ec,boost}$ and $\Delta_{T2SP}$ are signalled by higher layers (both UE and NodeB must know them), and can depend on rank (and channel type). As a result, the process is modified as follows. First, if the UE's rank=1 (i.e., the UE transmits one data stream) and the E-TFCI>E-TFCI$_{ec,boost,1}$, then boosting is applied and $\beta_{sc}$ is set such that the traffic to secondary pilot power offset $\Delta_{T2SP,1}$ is satisfied, i.e., the ratio between the power used to transmit data and the power used to transmit S-DPCCH should equal $\Delta_{T2SP,1}$. Second, if the UE rank=2 (i.e., the UE transmits two data streams) and E-TFCI>E-TFCI$_{ec,boost,2}$, then boosting is applied and $\beta_{sc}$ is set such that the traffic to secondary pilot power offset $\Delta_{T2SP,2}$ is satisfied, i.e., the ratio between the power used to transmit data and the power used to transmit S-DPCCH should equal $\Delta_{T2SP,2}$.

So depending on whether the UE rank is 1 or 2, different E-TFCI$_{ec,boost}$ and/or $\Delta_{T2SP}$ values are used. This is one example of how transmit power boosting can depend on transmission rank in a multi-antenna transmission. So if E-TFCI$_{ec,boost}$ depends on the UE rank (as in this example), a different E-TFCI$_{ec,boost}$ is used for E-DPCCH boosting and S-DPCCH boosting.

Figure 4:
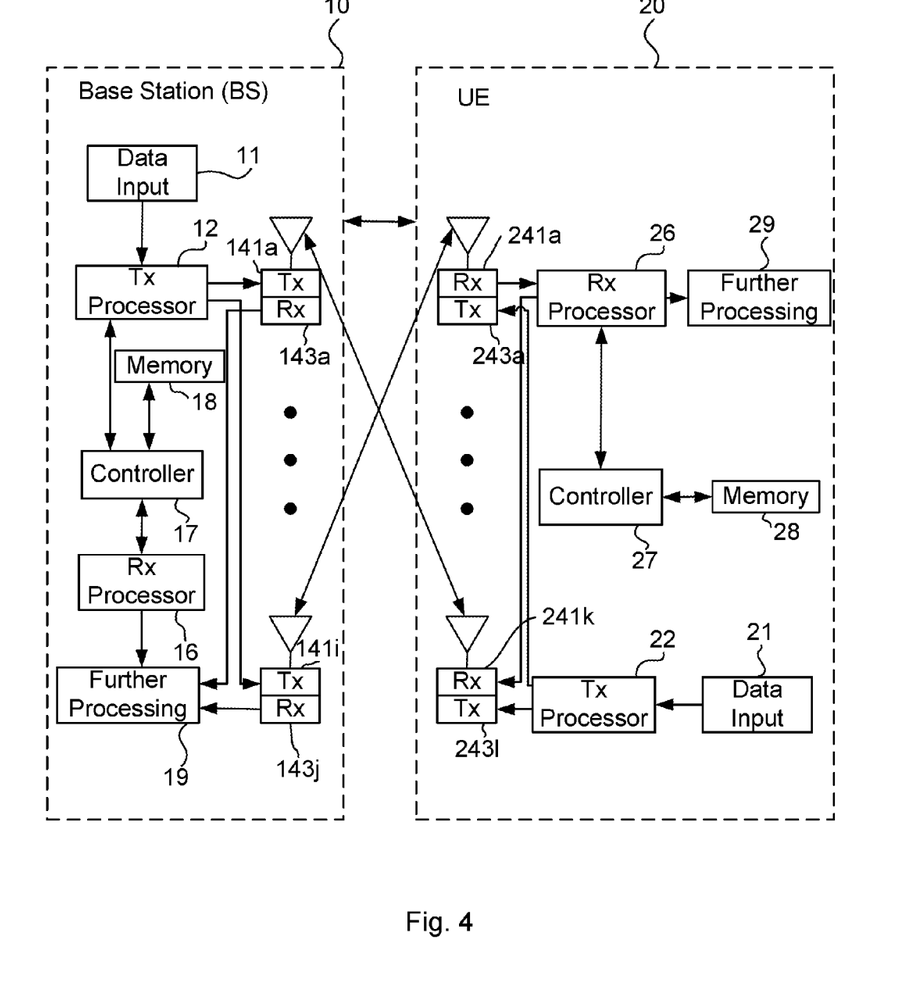
FIG. 4 shows a non-limiting example function block diagram of a base station and a UE of FIG. 1.

FIG. 4 shows a non-limiting example function block diagram of a base station 10 (an example of a radio transmitting and/or receiving node) and a UE 20 (an example of a radio receiving node and/or transmitting node) that are both multiple antenna communication (e.g., MIMO, CLTD, etc.) capable. The base station 10 may be arranged to signal directly to UE 20 whether multiple antenna communication should be turned on or off for the UE 20, or the UE 20 may be capable of making that decision.

The base station 10 comprises a data input 11, and a transmission processor 12 that receives data from the data input 11 and processes the data into transmittable data over different transmitters 141a-141i. The transmission processor 12 may demultiplex data, signaling, and pilot symbols into multiple streams, and these are fed to a plurality of transmitters 141a-141i in accordance with a particular MIMO-mode.

The base station 10 further comprises a number of receivers 143a-143j arranged to receive data from the UE 20. The received data is transferred to a receiving processor arrangement 16. As described above, receiving processor arrangement 16 can be configured to detect the transmission rank of the UE, the E-TFCI selected by the UE or similar information that indicates the amount of data the UE is to transmit uplink for each transmission, as well as to recover feedback information and traffic data sent by UE 20 on that or other channels. The received data is provided for further processing 19 of the data in any desired manner. A controller 17 controls the different devices within the base station 10 using a memory 18 comprising program code stored thereon. Such program code, when executed allows the controller to follow the two-step procedure described above for the UE to determine transmit powers each uplink channel has used and to be able correctly decode uplink data received, perform channel estimation, etc.

The UE 20 comprises a data input 21 containing data to be transmitted by processing the data in a transmission processor 22. The data is modulated and split up in accordance with a MIMO-mode and transferred to a plurality of transmitters 243a-243k. The UE 20 may transmit feedback information, including rank, TFCI, transmit power level, CQI (as well as perhaps other information such as ACK/NACK information), to the base station 10. The transmit information is processed in the transmission processor 22 and sent using the transmitters 243a-243k. The data from the base station 10 is received at a number of receivers 241a-241l and transferred to a receiving processor 26 configured to estimate the channel response based on a received pilot and provides a channel estimate. The receiving processor 26 further detects the multiple antenna function of the received data and performs further processing 29, such as descrambling, despreading, decoding, etc., of the received data. The UE 20 further comprises a controller, connected to a memory 28 containing program code, for controlling the operation of the UE 20.

Figure 5A:
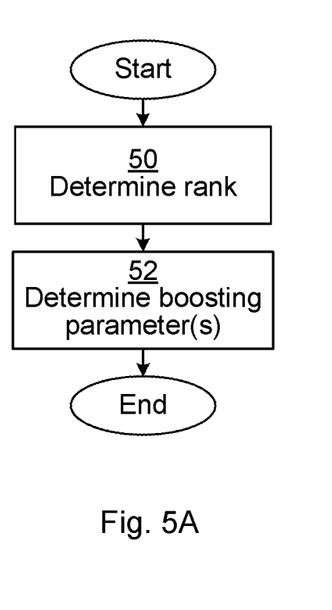
FIGS. 5A-B are flow charts illustrating methods for rank dependent boosting performed in a UE of FIG. 1.
Figure 5B:
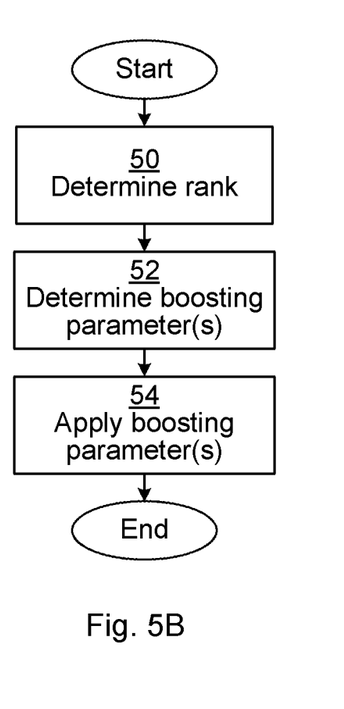

FIGS. 5A-B are flow charts illustrating methods for rank dependent boosting performed in a UE 20 of FIG. 1. The method is performed for controlling MIMO channel boosting and is performed in a UE which is capable of MIMO transmissions using a primary and a secondary stream as described above. First, the method illustrated in FIG. 5A will be described.

In a determine rank step 50, a rank which is used for uplink transmissions from the UE is determined. This is the rank that is currently used by the UE for the uplink transmissions to the base stations. Rank can e.g. be defined ad a number of independent data streams, or spatial layers. In MIMO, each independent data stream can be transmitted using multiple antennas.

In a determine boosting parameter(s) step 52, at least one boosting parameter is determined. The boosting parameter(s) affect power boosting of the E-DPCCH, and the S-DPCCH.

This determination is based on the rank, and can thus differ between rank 1 operation and rank 2 operation.

The boosting parameter(s) can be a threshold value such as $E\text{-}TFCI_{ec,boost}$ described in more detail above, defining different boosting schemes when the E-TFCI is above or below the boosting parameter.

The boosting parameter (such as $E\text{-}TFCI_{ec,boost}$) can be determined to be an absolute value when the rank is two. For example, the absolute value could be a negative number, such as −1, to effectively turn on boosting for both the E-DPCCH and the S-DPCCH whenever there are two streams (i.e. rank 2).

When the rank is one, the boosting parameter (such as $E\text{-}TFCI_{ec,boost}$) can be determined using signalling by higher layers. When the boosting parameter fails to be signalled by higher layers, it can be set to be a default value of 127, requiring higher E-TFCI to activate boosting compared to the rank 2 case.

Now, the method illustrated in FIG. 5B will be described. It will here only be described parts of the method which are different from what is described above with reference to FIG. 5A.

In FIG. 5B, there is an additional step which is an apply boosting parameter(s) step 54. In this step, the boosting parameter(s) determined in the determine boosting parameter(s) step are applied in the UE which performs the method, as explained in more detail above.

Figure 6:
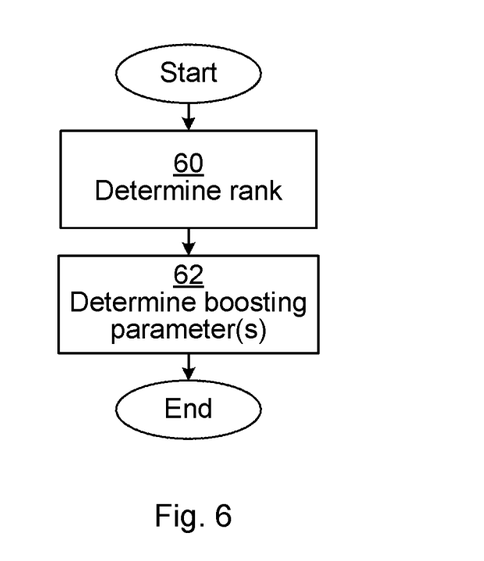
FIG. 6 is a flow chart illustrating a method for rank dependent boosting performed in a base station of FIG. 1.

FIG. 6 is a flow chart illustrating a method for rank dependent boosting performed in a base station of FIG. 1. The method is performed for determining what MIMO boosting is used by a particular UE. This method is performed in a base station (10 of FIG. 1) capable of receiving MIMO transmissions from the particular UE using a primary and a secondary stream. The method can be executed independently in parallel for several UEs.

In a determine rank step 60, the base station determined a rank which is used for uplink transmissions from the particular UE.

In a determine at least one boosting parameter step 62, the base station determines at least one boosting parameter used by the particular UE, based on the rank. The boosting parameter affects power boosting of the E-DPCCH and the S-DPCCH. This is This step corresponds to the determine boosting parameter(s) step 52 of FIGS. 5A-B, performed by the UE. In other words, the base station performs the same determination that is performed by the UE. This is used by the base station to allow the network side to take similar steps as described with reference to FIGS. 5A-B to know what power that is used on each UL channel. This knowledge may be needed in order to decode data correctly, do channel estimation, etc. By decoding the control channel E-DPCCH, the NodeB determines the E-TFCI selected by the UE in the E-TFC selection process. Next, the NodeB can apply the same procedure as the UE just described to derive what transmit powers each channel has used.

The technology described above offers many benefits. For example, the technology facilitates rank-dependent boosting so that different degrees of power boosting depending on rank, and possibly also on channel type, can be supported, which increases flexibility and enhances performance. Such flexibility means that different channels can decide whether or not to apply boosting, and if so, to apply different amounts of boosting. Performance can be enhanced because different channels benefit differently based on the amount of boosting, i.e., some need more boosting and some need less. Also, this might depend on the current rank. For example, for rank 1 transmission, it might be better to allocate the S-DPCCH power to transmit data sent on the primary stream since no data is transmitted on the secondary stream Although the description above contains many specifics, they should not be construed as limiting but as merely providing illustrations of some presently preferred embodiments. For example, non-limiting, example embodiments of the technology were described in an UMTS context. But the principles of the technology described may also be applied to other radio access technologies. Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method for controlling multiple input multiple output, MIMO, channel boosting, performed in a user equipment, UE, capable of MIMO transmissions using a primary and a secondary stream, the method comprising the steps of:
    determining a rank used for uplink transmissions from the UE;
    determining a boosting parameter affecting power boosting of an Enhanced Dedicated Physical Control Channel, E-DPCCH, and a Secondary Dedicated Physical Control Channel, S-DPCCH, based on the rank;
    wherein the steps of determining the boosting parameter further comprises:
    determining the boosting parameter to be a default value of 127 when the boosting parameter fails to be signaled by higher layers and when the rank is one; and
    determining the boosting parameter to be less than or equal to zero for at least the S-DPCCH when the rank is two or more; and
    applying the boosting parameter affecting power boosting to at least one uplink transmission, wherein the boosted power used on each uplink transmission is utilized by a base station to decode data and to perform channel estimation.

2. The method according to claim 1, wherein the rank is defined as a number of independent data streams, or spatial layers.

3. The method according to claim 1, wherein the boosting parameter is a threshold value, defining different boosting schemes when an Enhanced Transmit Format Combination Indicator, E-TFCI, is above or below the boosting parameter.

4. The method according to claim 1, wherein the signaling by higher layers comprises a single boosting parameter, the single boosting parameter is used for the E-DPCCH and the S-DPCCH.

5. The method according to claim 1, further comprising determining a boosting parameter for the S-DPCCH relative to a boosting parameter for the E-DPCCH.

6. A user equipment, UE, arranged to control multiple input multiple output, MIMO, channel boosting, the UE being capable of MIMO transmissions using a primary and a secondary stream, and comprising:
    a memory configured to store program code; and
    a plurality of antennas to transmit uplink data; and
    a controller configured to execute program code stored in the memory to:

determine a rank used for uplink transmissions from the UE;

determine a boosting parameter affecting power boosting of an Enhanced Dedicated Physical Control Channel, E-DPCCH, and a Secondary Dedicated Physical Control Channel, S-DPCCH, based on the rank;

wherein the boosting parameter is determined to be a default value of 127 when the boosting parameter fails to be signaled by higher layers and when the rank is one; and the boosting parameter is determined to be less than or equal to zero for at least the S-DPCCH when the rank is two or more;

apply the boosting parameter affecting power boosting to at least one uplink transmission, wherein the boosted power used on each uplink transmission is utilized by a base station to decode data and to perform channel estimation.

7. The UE according to claim 6, wherein the rank is defined as a number of independent data streams, or spatial layers.

8. The UE according to claim 6, wherein the boosting parameter is a threshold value defining different boosting schemes when an Enhanced Transmit Format Combination Indicator, E-TFCI, is above or below the boosting parameter.

9. A method for determining what multiple input multiple output, MIMO, channel boosting is used by a user equipment (UE), the method being performed in a base station capable of receiving MIMO transmissions from the UE using a primary and a secondary stream, and comprising the steps of:

determining at the base station a rank used for uplink transmissions from the UE; and determining at the base station a boosting parameter used by the UE affecting power boosting of an Enhanced Dedicated Physical Control Channel, E-DPCCH, and a Secondary Dedicated Physical Control Channel, S-DPCCH, based on the rank;

wherein the steps of determining at the base station the boosting parameter further comprises:

determining the boosting parameter to be a default value of 127 when the boosting parameter fails to be signaled by higher layers and when the rank is one; and determining the boosting parameter to be less than or equal to zero for at least the S-DPCCH when the rank is two or more; and wherein the base station utilizes the boosting parameter to determine boosted power used on each uplink transmission to decode data and to perform channel estimation.

10. The method according to claim 9, wherein the rank is defined as a number of independent data streams, or spatial layers.

11. The method according to claim 9, wherein the boosting parameter is a threshold value defining different boosting schemes when an Enhanced Transmit Format Combination Indicator, E-TFCI, is above or below the boosting parameter.

12. A base station arranged to determine what multiple input multiple output, MIMO, channel boosting is used by a user equipment (UE), the base station being capable of receiving MIMO transmissions from the UE using a primary and a secondary stream and comprising:

a memory configured to store program code; and a plurality of antennas to receive uplink data; and a controller configured to execute program code stored in the memory to:

determine at the base station a rank used for uplink transmissions from the UE; and determine at the base station a boosting parameter used by the UE affecting power boosting of an Enhanced Dedicated Physical Control Channel, E-DPCCH, and a Secondary Dedicated Physical Control Channel, S-DPCCH, based on the rank;

wherein the boosting parameter is determined to be a default value of 127 when the boosting parameter fails to be signaled by higher layers and when the rank is one; and the boosting parameter is determined to be less than or equal to zero for at least the S-DPCCH when the rank is two or more; and wherein the base station utilizes the boosting parameter to determine boosted power used on each uplink transmission to decode data and to perform channel estimation.

13. The base station according to claim 12, wherein the rank is defined as a number of independent data streams, or spatial layers.

14. The base station according to claim 12, wherein the boosting parameter is a threshold value defining different boosting schemes when an Enhanced Transmit Format Combination Indicator, E-TFCI, is above or below the boosting parameter.

15. The base station according to claim 12, wherein the base station is a node B.

* * * * *